US008660718B2

(12) United States Patent
Holder

(10) Patent No.: US 8,660,718 B2
(45) Date of Patent: Feb. 25, 2014

(54) FLIGHT OPERATIONAL CONSEQUENCES SYSTEM

(75) Inventor: Barbara Elaine Holder, Seattle, WA (US)

(73) Assignee: The Boeing Company, Chicago, IL (US)

( * ) Notice: Subject to any disclaimer, the term of this patent is extended or adjusted under 35 U.S.C. 154(b) by 69 days.

(21) Appl. No.: 13/232,387

(22) Filed: Sep. 14, 2011

(65) Prior Publication Data

US 2013/0066487 A1 Mar. 14, 2013

(51) Int. Cl.
*G06F 7/70* (2006.01)

(52) U.S. Cl.
USPC .......................................................... 701/14

(58) Field of Classification Search
None
See application file for complete search history.

(56) References Cited

U.S. PATENT DOCUMENTS 5,161,158 A * 11/1992 Chakravarty et al. ........... 714/26
2002/0120375 A1* 8/2002 Draoullec et al. .............. 701/29
2007/0052554 A1* 3/2007 Wallace et al. ............... 340/971
2008/0027629 A1 1/2008 Peyrucain et al.
2010/0017049 A1 1/2010 Swearingen et al.
2012/0029736 A1* 2/2012 Guilley et al. .................... 701/3
2012/0041639 A1* 2/2012 Followell et al. ............ 701/34.3

FOREIGN PATENT DOCUMENTS

EP 2234087 A1 9/2010

OTHER PUBLICATIONS

Ahmad, A. et al., "Operational Risk of Aircraft System Failure," International Journal of Performability Engineering, vol. 6, No. 2, Mar. 2010, pp. 149-158.
International Search Report & Written Opinion dated Nov. 19, 2012 in PCT Application No. PCT/US12/50533.

* cited by examiner

*Primary Examiner* — James Trammell
*Assistant Examiner* — Michael D Lang
(74) *Attorney, Agent, or Firm* — Hope Baldauff, LLC

(57) ABSTRACT

According to an embodiment, a method provides flight operational consequence information by receiving a status indication associated with an aircraft component at a processing device in the aircraft during a flight. The processing device ascertains one or more operational consequences that includes displaying text strings associated with the status indication, wherein each of the one or more operational consequences are associated with one or more flight segments of the flight. At least a subset of the one or more operational consequences are provided on a display associated with the processing devices and an indication is provided on the display of the one or more flight segments associated with the one or more operational consequences.

17 Claims, 6 Drawing Sheets

FLIGHT OPERATIONAL CONSEQUENCES SYSTEM

BACKGROUND

Commercial and military aircraft comprise various electronic systems that provide information to flight crew regarding the status of various components and systems in the aircraft. Numerous sensors are incorporated in an airplane for measuring and reporting various conditions for components, including, but not limited to: pressure in various fluid systems (e.g., fuel, engine lubricating oil, hydraulic oil for moving control surfaces, etc.), temperature of components or fluids, mechanical positioning sensors, etc. These status indicators can be provided to the flight crew via various methods, including by: emitting a sound, activating or flashing a light, and presenting an icon or text message on a digital display screens on the flight control panel.

Because there are a large number of status indications that can be reported to the flight crew, it is imperative that the flight crew is adequately trained to completely understand the meaning of each status indicator and its potential consequences. Flight crews constantly train to handle and assess various conditions that can arise that are associated with a reported status indication. However, it can be difficult to rapidly recall and assess the impact of the several hundred different types of status indicators that the flight crew may potentially receive. Further, these status indicators are often unique to the design of the aircraft, which evolve as technology changes. Thus, flight crew must be trained to handle new types of status indicators.

A system that organizes and assesses the impact of status indicators would allow more informed decisions to be rapidly made by the flight crew. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a method provides flight operational consequences information by receiving a status indication associated with an aircraft component at a processing device in the aircraft during a flight. The processing device ascertains one or more operational consequences that includes displaying text strings associated with the status indication, wherein each of the one or more operational consequences are associated with one or more flight segments of the flight. At least a subset of the one or more operational consequences are provided on a display associated with the processing device and an indication is provided on the display of the one or more flight segments associated with the one or more operational consequences.

In another embodiment disclosed herein, a system provides operational consequence information to a user and comprises a local area network, a memory, a display, and a processor. The local area network is configured to receive a status indication from one of a plurality of systems in an aircraft. The memory is configured to store a plurality of operational consequences associated with the status indication, wherein the plurality of operational consequences are associated with one or more flight segments. The display is configured to display the plurality of operational consequences to the user. The processor is configured to receive the status indication from the local area network interface, determine a current flight segment of a flight of the aircraft, retrieve the plurality of operational consequences associated with the status indication, and present on the display a status indication message and a first subset of the plurality of operational consequences associated with the current flight segment.

In another embodiment disclosed herein, a computer storage medium has computer executable instructions stored thereon which, when executed by a computer, cause the computer to perform various operations, including receive a status indication indicating an abnormal condition associated with a component in an aircraft, determine a severity level associated with the status indication, and display a notification to a user of an operational consequence associated with the status indication. Further, the computer performs operations to receive input from the user to display a status indication message and the operational consequence, and retrieve the operational consequence associated with the status indication for a current flight segment. Finally, the computer displays to the user the status indication message, the operational consequence, and a flight segment indication corresponding to the current flight segment.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
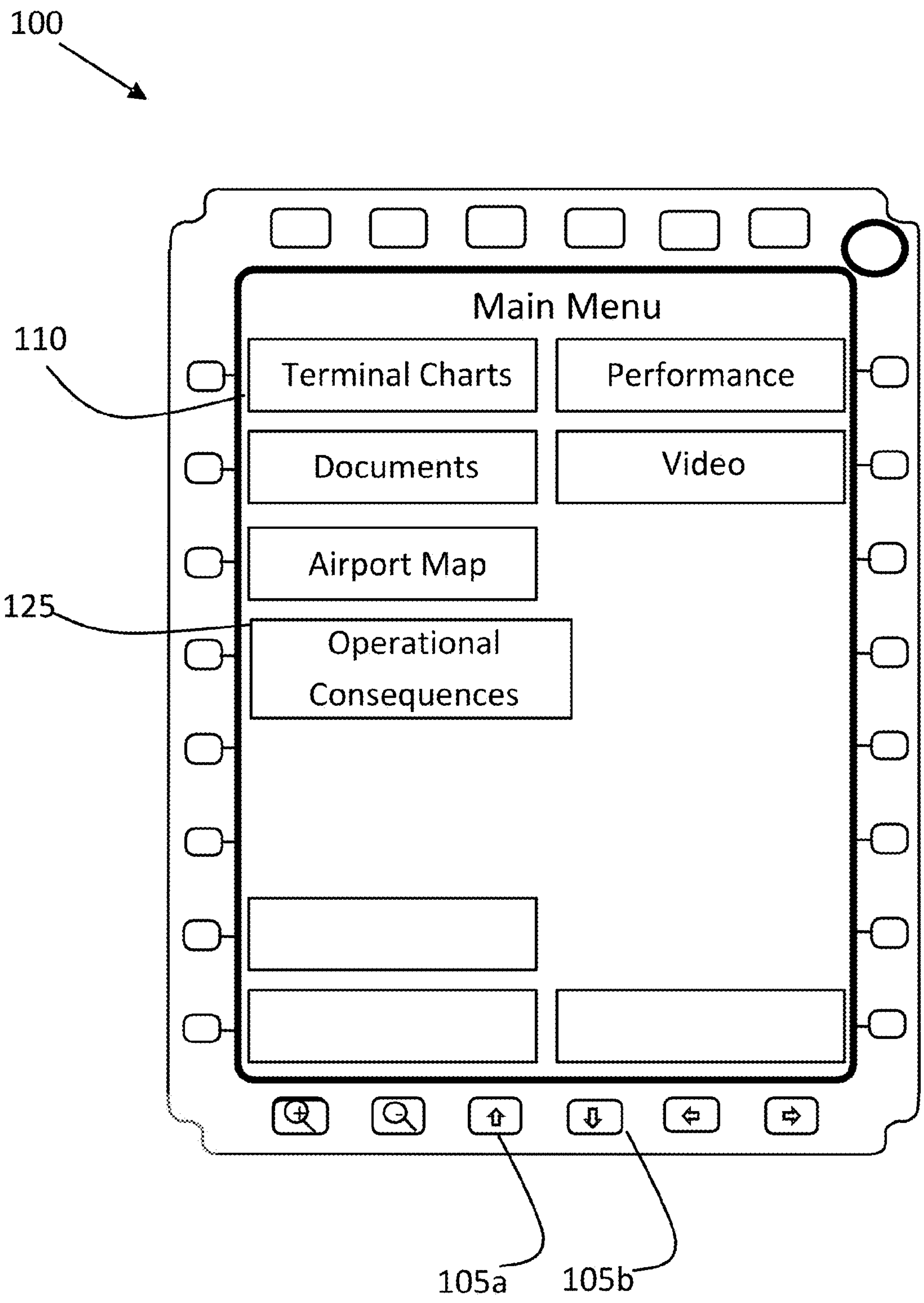
FIG. 1 illustrates one embodiment of an avionics display illustrating one aspect of the operational consequences system according to at least one embodiment disclosed herein.

The following detailed description is directed to an operational consequences system ("OCS") and method that receives various status indicators and provides flight crew with flight operational consequences of the condition reported by the status indicator. The OCS can also provide a checklist associated with the status indication and/or synoptic information about components or the system associated with the status indication. The OCS tracks the current flight segment of the current flight, and is able to categorize the operational consequences information based on the current or a future flight segment, thus allowing the flight crew to more accurately assess and respond as necessary. Although various embodiments are described in the context of a commercial passenger aircraft it should be recognized that the application of the disclosure is not limited to commercial aircraft, but can apply to military aircraft, space craft, nautical ships, and other large and complicated systems requiring real time information analysis by an operator. In the following detailed description, references are made to the accompanying drawings by way of illustration and various embodiments of the disclosure. In the drawings, like numerals represent like elements.

Passenger and cargo aircraft incorporate numerous sensors for obtaining information about the condition of various components and systems. The status indicators may be provided to various on-board data handling systems. Certain systems, such as the engine indications and crew alerting system ("EICAS") offer detailed information to the flight crew on the condition of various components in a jet engine. Other systems provide information about the status of the electrical system, hydraulic system, fuel system, landing gear system, flight control system, etc. There are hundreds of sensors that can potentially provide status indications to the flight crew.

As used herein, "status indication" refers to information providing status information or condition about an aircraft component or system to the OCS. Status indications are particularly important when an abnormal condition occurs, particularly during flight. Thus, for the most part, focus is given on abnormal conditions as reflected by a status indication. A status indication informs the flight crew as to which aircraft components or systems are not functioning properly. Depending on the nature of the status indication, the information can be very detailed, or very high level. The status indications can be presented to the flight crew in a variety of conventional ways, from a simple warning light to a text message on a computerized flight display. Evaluation of multiple simultaneous status indications can be difficult for flight crew.

Presenting status information to the flight crew informs the crew of a potential issue or condition, but the flight crew must still adequately respond to the condition. The flight crew must be able to readily understand the meaning of the status condition, its implication for the operability of the present aircraft, and its relative impact to the operation of the current flight. During an abnormal condition, several status indicators may be reported, and it can be difficult for the flight crew to quickly access the operational consequences of each status indicator. Once the impact is accessed, the flight crew must plan and perform any required work-around procedures associated with the status condition.

The OCS described herein facilitates the flight crews' assessment of the severity level of a condition and informs the flight crew of the consequences to the operation of the aircraft and to the remaining segments of the flight. In addition, the OCS can provide checklists for working-around the reported condition and provide further information regarding the systems associated with the condition. Further, because the impact of a status indicator has particular relevance to each phase of the flight, the OCS can categorize and present operational consequence information associated with a particular flight segment for the current flight.

The OCS interacts with the flight crew using a computer controlled digital display device that is programmed to provide operational consequence information as appropriate to the flight crew. One embodiment of the OCS display is shown in FIG. 1. FIG. 1 depicts the screen 100 of a computerized display, sometimes referred to as an "electronic flight bag" ("EFB"). The EFB derives its name from the suitcase-like flight bags originally carried by flight crew to carry paper flight information manuals and information. Pilots would carry manuals with airports runway and terminal configuration, aircraft information, flight operating procedures, flight manifests, etc. Much of this information is now digitized and available for review using a computerized touch screen display. As used herein, a touch screen display can include a display with one or more buttons located on the periphery of the display and associated with one or more regions of the display. Hence, flight crews are not required (to the same extent) to carry of all these manuals. Hence, the aircraft information system managing this information is sometime referred to the electronic flight bag.

The EFB in FIG. 1 is a type of high level portal for accessing various types of flight related information. In one implementation, the computerized display can be a touch screen, so that the various informational icons can be selected to request the desired information. For example, the "terminal charts" 110 icon can be touched to retrieve information about different airport terminals. Various control functions 105*a*, 105*b* can be invoked by the flight crew to scroll and view the documents as well. Other control functions may be used to select functions, power up the system, adjust brightness, etc. It should be appreciated that any number and type of icons and controls may be used with respect to the EFB.

The EFB provides a ready mechanism for flight crew to access the OCS, and also provides an initial level notification that a status indication has been received and that further flight operational consequence information is available. Flight operational consequence information is information impacting the operation of the aircraft and/or the flight based on the abnormal condition as reported by the status condition. For example, a status indication reporting the main auxiliary power unit ("APU") is non-functional may have an operational consequence of using a backup APU during certain portions of the flight.

As shown by icon 125, an icon on the EFB display screen is allocated to the OCS. The icon 125 serves two functions. First, the icon 125 itself is an output indicator signifying a status indication has been received and that further operational consequence information regarding a condition is presently available. This notification is accomplished by changing the color of the operational consequences icon from a normal color (e.g., white/black) to a more visible color (e.g., red or orange). In some embodiments, a relative severity level of the status indication may be indicated by using different colors or blinking the icon. Thus orange may be used for a low impact or low severity level notification, and red can be used for a high severity level. Other embodiments for indicating a relative severity level are possible.

While the operational consequences icon 125 functions as an output indicator and a means to access the OCS, the OCS does not necessarily replace other existing mechanisms or systems for providing status indications to the flight crew, nor is the OCS the primary method for informing the flight crew of a status indication. Specifically, in one embodiment presented herein, the status indications may be presented via other systems to the flight crew, for example, using lights or text based messages on flight information computer displays, etc. In one embodiment, the status indications are provided in parallel with another system to the OCS. The OCS then informs the flight crew of that operational consequence information can be obtained. In other embodiments, the OCS can be the sole portal for informing the flight crew of the existence of the status indication, but this would require the OCS to supplant, rather than supplement, existing status notification systems in an aircraft.

In regards to the second function performed by the icon 125 in FIG. 1, it provides an entry point into the OCS. When the icon is pressed, the EFB display then switches to presenting operational consequences information and flight segment information to the flight crew.

Figure 2:
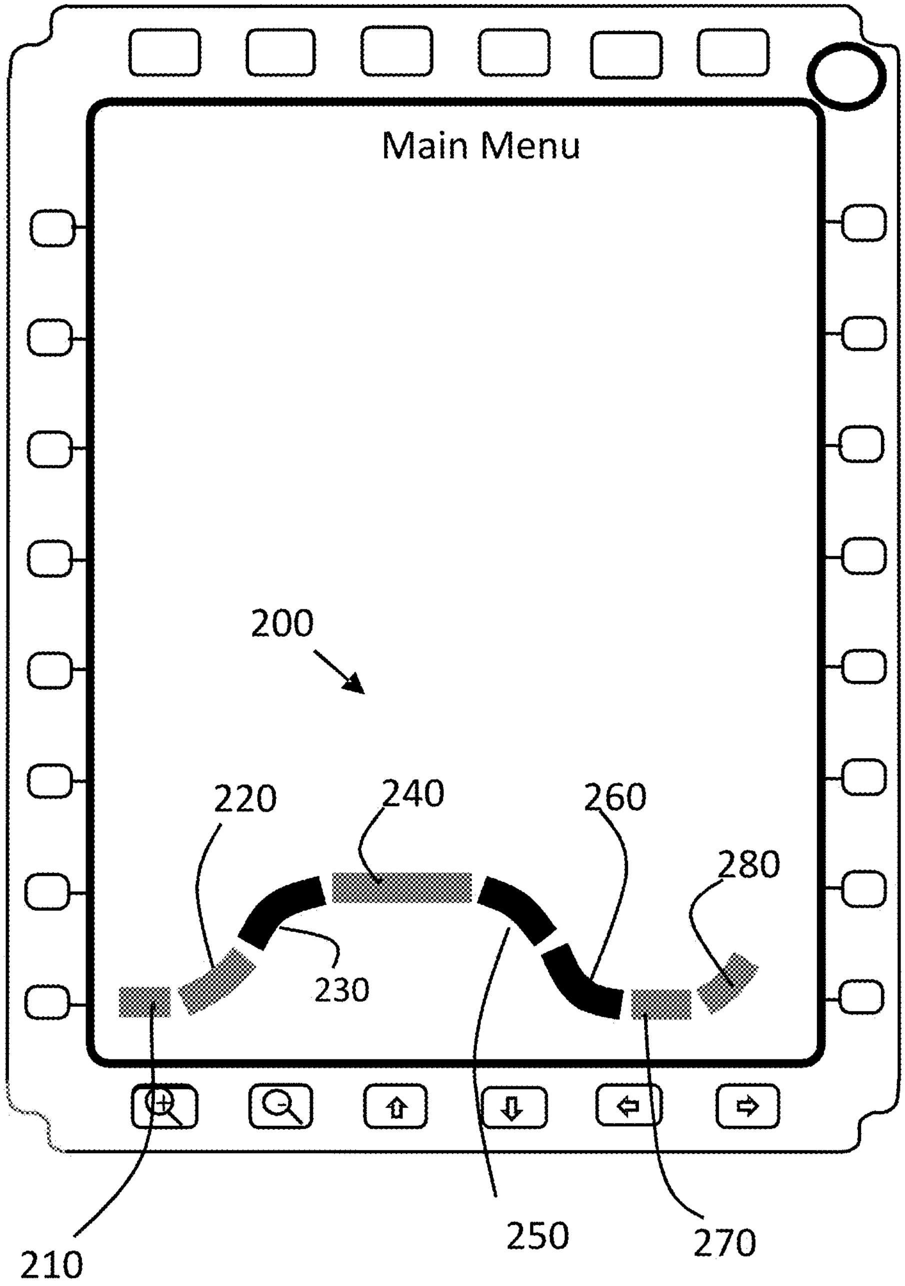
FIG. 2 illustrates one embodiment of a display layout for providing flight segment information according to at least one embodiment disclosed herein.

The OCS provides operational consequences information organized in the context of a flight segment. A flight segment is a portion of the flight and includes: ground, takeoff, climb, cruise, descent, approach, landing, and potentially, a go-around (e.g., aborted landing). The ground portion is usually defined as when the wheels are touching the ground. The takeoff then begins and ends a short time later. The exact delineation between, e.g., takeoff flight segment and climb flight segment is not relevant, other than a criteria exists to distinguish the phases. These eight phases can be graphically depicted, as shown in FIG. 2. FIG. 2 depicts the flight segments 200 as a series of lines with the ground segment 210, followed by the takeoff segment 220, the climb segment 230, the cruise segment 240, the descent segment 250, the approach segment 260, the landing segment 270, and the go-around segment 280. In a typical flight, the go-around segment 280 does not occur. In some embodiments, the flight segment display 200 may be also presented with a linear time line, which represents the duration of the current flight. In other embodiments, more or fewer segments of a flight may be defined.

The OCS is aware of the aircraft's current flight segment. The OCS typically organizes operational consequence information based on a flight segment. The operational consequence information is presented for the current flight segment or a future flight segment. Thus, once the aircraft is cruising, information relevant to an earlier flight phase (e.g., takeoff) is not presented to the flight crew. If the aircraft is taxing on the ground prior to takeoff, then all the segments are current or future flight segments. The flight crew can select to view flight operational consequence information associated with a particular flight segment by selecting the particular flight segment on the OCS display. The OCS then presents the operational consequences for that status indication that is associated with the selected flight segment.

In one embodiment, the flight segments are color coded to allow ready indication of impact of the status indication with respect to the flight segment. In one embodiment, past flight segments or flight segments not presently selected are indicated in blue. As noted above, operational consequence information is typically not provided for past flight segments. If a current or future flight segment is presented in green, no operational consequences are present. However, a current or future flight segment coded in yellow indicates there are flight consequences. In other embodiments, a red color can also be used, with the yellow and red colors representing a respective low and high severity level of the consequences.

For example, a malfunction reported during the cruising flight segment may impact the only the landing flight segment, so only the landing flight segment would be coded in yellow. In another embodiment, a status indication may impact all of the current and remaining flights segments.

The flight segments 200 in FIG. 2 usually are presented in conjunction with other OCS information. An embodiment 300 in FIG. 3 of the OCS illustrates the display after the flight crew has selected the operational consequence icon 125 from the EFB. This embodiment displays four types of information. The first is the name (or message) of the status indication 310, which is "Anti-skid System." For sake of illustration, it is assumed that the status indication pertains to some condition impacting the operation of the anti-skid control system. The exact name of the status indication message can vary, and the message functions as a user-friendly label to identify a particular status condition and the impacted component or system. The status indication message, by itself, may not be completely descriptive of the relevant condition. As noted before, the OCS receives status indications from other systems that monitor, receive, and process sensor information.

The flight segment indication 200 portion on the display is examined next. As noted before, the flight segment indication provides a graphical depiction of the various flight phases. In this example, two flight segments are impacted by the anti-skid control system condition reported by the status message—the ground segment 210 and the landing segment 270. The impacted flight segments are depicted using a different style of line, since it is not readily possible to depict a change of color in the black and white diagram of FIG. 2. In the absence of the flight crew selecting a particular flight segment, the OCS presents operational consequences for the first impacted flight segment. In one embodiment, the impact to past flight segments are not shown, thus it can be concluded in this embodiment that the aircraft is presently in the ground flight segment (e.g., taxing on the ground).

The operational consequence information 320 is presented as text based information in the middle portion of the display. The operational consequence information provides one or more consequences of the condition as reported in the status indication message 310. There may be more than one page of consequential information provided, and the flight crew can use the aforementioned controls to scroll through the various pages of information on the display. For purposes of this illustration, three operational consequences are displayed. The first instructs the flight crew to increase the flight planning fuel amount, the second involves takeoff and landing performance criteria, and the third instructs to leave the gear extended after takeoff.

In this embodiment, the display also includes an icon 330 for recalculating system performance. The operational consequences of a status indicator may include recalculating one or more parameters such as landing speed, fuel consumption, takeoff/landing distances, descent rate, etc. To aid the flight crew in ascertaining the flight consequences, the selection of icon 330 will recalculate the appropriate flight parameters in the context of the indicated status condition. Thus, in the example illustrated, recalculating the flight performance level with regard to takeoff and landing distances can be recalculated for the current flight plan by selecting the "PERF" (i.e., performance) icon 330. The result may be displayed on another screen (not shown). In other embodiments, the performance recalculation may prompt the user to enter further information necessary to perform the recalculation. A variety of other icons representing various other types of calculations or functions can be provided to the flight crew for recalculating other system parameters.

Figure 3:
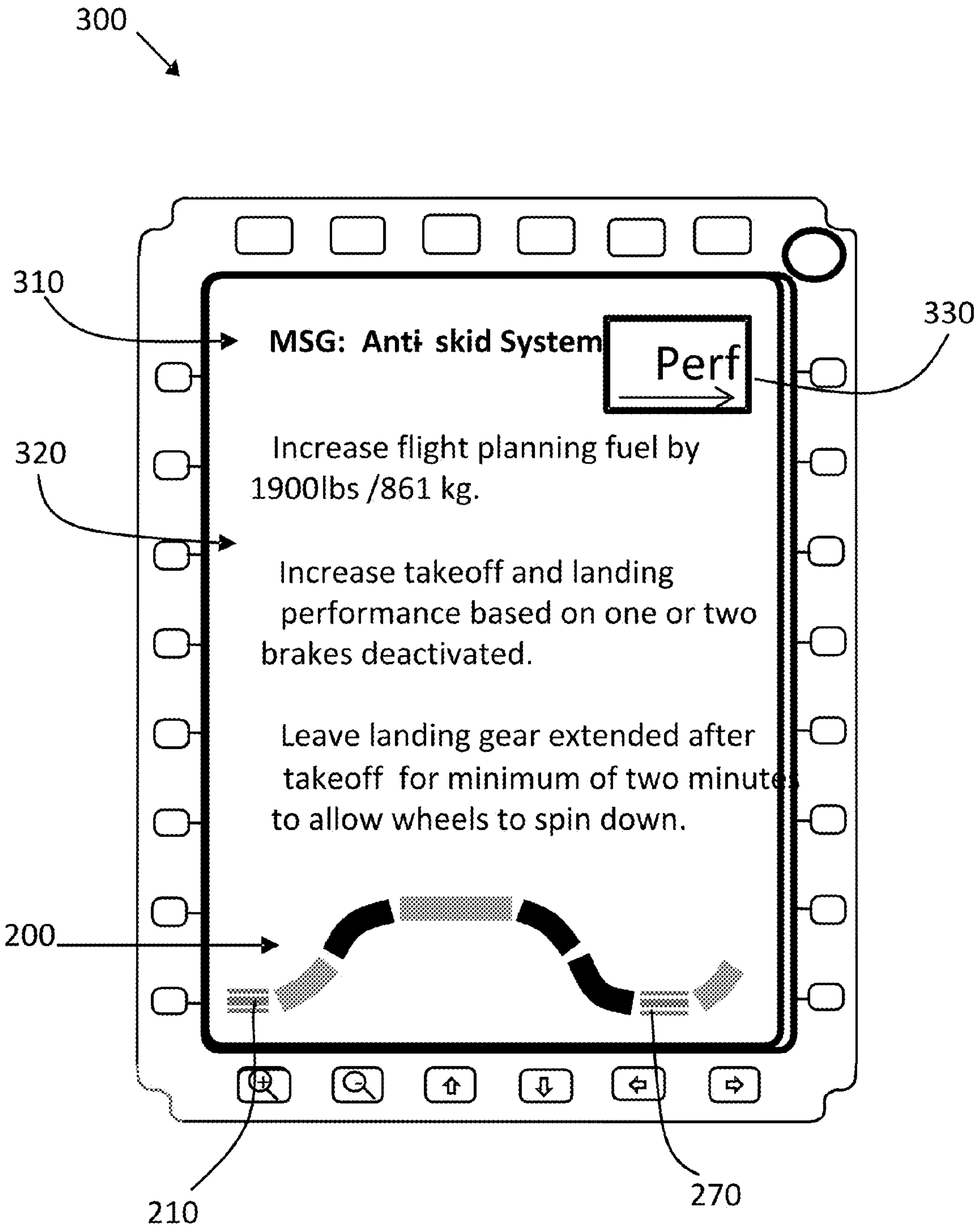
FIG. 3 illustrates one embodiment of an avionics display providing operational consequences information for an anti-skid control system according to at least one embodiment disclosed herein.
Figure 4:
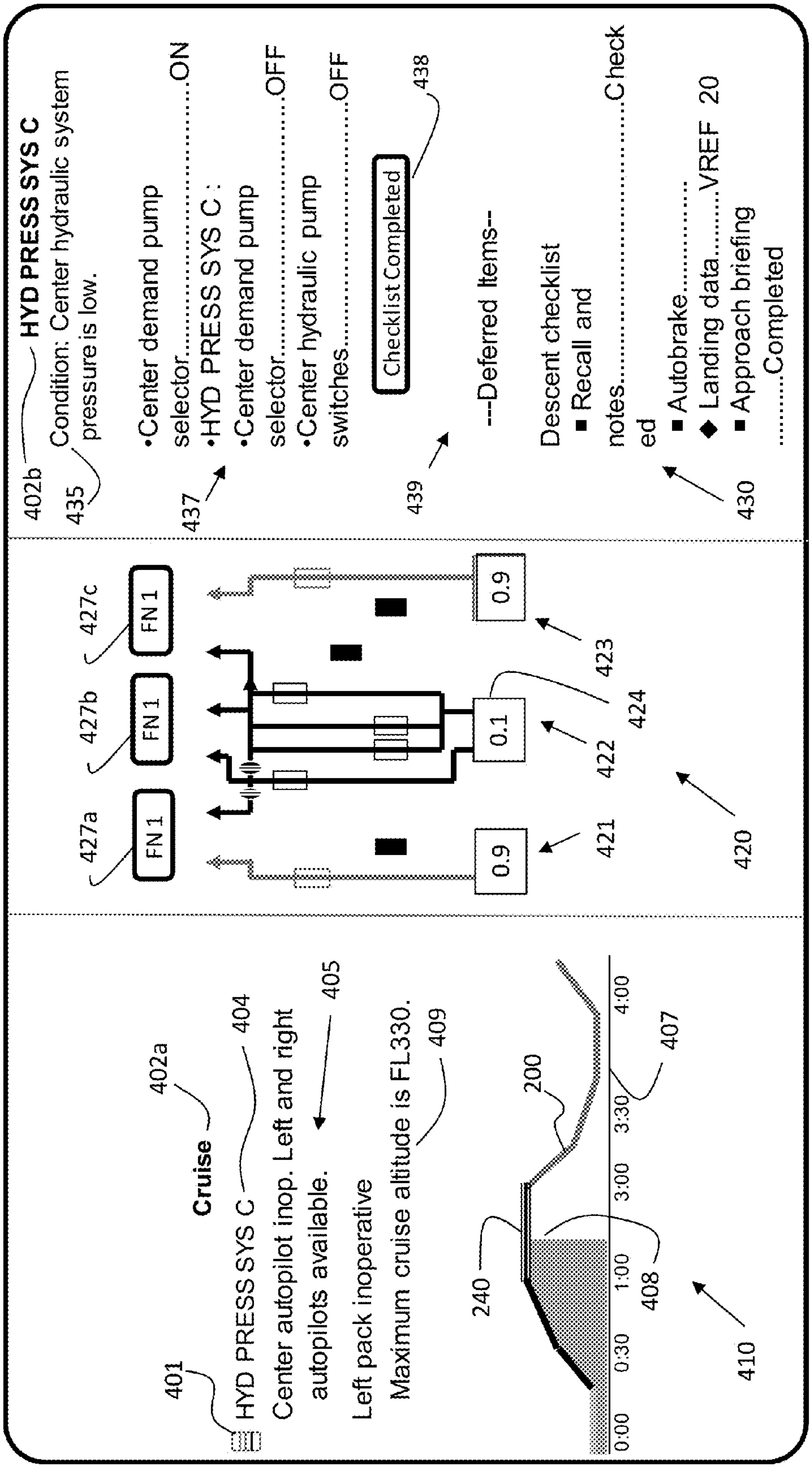
FIG. 4 illustrates another embodiment of providing operational consequences information including a synoptic diagram provided according to at least one embodiment disclosed herein.

While FIG. 3 illustrates one embodiment of providing operational consequences of a status indication to the flight crew, FIG. 4 illustrates another embodiment of an OCS display that illustrates providing further types of information. Turning to FIG. 4, this screen display presumes the flight crew has been presented with an operational consequences indication as discussed with FIG. 1, and has selected the operational consequences icon 125.

FIG. 4 includes three main panels of information, referred to herein as the left panel 410, the middle or center panel 420, and the right panel 430. Starting with the left panel 410, it displays the flight segments 200 along with a timeline 407 showing the relative duration of the planned flight. The current time into the flight is shown by a line 408 which is periodically repositioned with the passage of time. Thus, as shown in this embodiment, the aircraft is currently in the cruise segment 240. The flight segment can be also reflected by distinctively displaying the flight segment 240 in a different color, shown here as a distinctive line type.

The cruise segment is also identified as text in the left panel 402*a*. Recall that the default is to present the current or next impacted flight segment to the flight crew, but that the flight crew can opt to select a particular flight segment by touching the appropriate flight segment on the display. Doing so would not alter the time line 408, but it would alter the color of the selected flight segment, and the text of the operational consequences 402*a* associated with the selected flight segment.

Under the text based flight segment 402*a*, a list of conditions and consequences are presented in the leftmost panel 410. The status indication message in this embodiment is "HYD PRESS SYS C" 404. This message indicates the status indication that has been reported to the OCS. In this case, the condition involves a hydraulic pressure condition in system C. Adjacent to the status indication message 404 is an icon 401, which indicates to the flight crew that a checklist is defined for the status indication message, and that it can be viewed by selecting the icon 401 or other appropriate function key on the touch screen.

Below the status indication message, the text in section 405 can comprise further lower level condition of the impacted components and associated consequences. This text includes the flight operational consequences information and may include information about which systems or components are inoperative, as well as operative. Other pertinent information such associated operational consequences of the condition are provided. For example, a maximum cruise altitude 409 of Flight Level 33,000 feet is recommended in this example.

Each status indication message may have an associated checklist. In other embodiments, each condition or operational consequences information could be associated with the checklist. The checklist broadly defines a list of information, actions, or commands for the flight crew to review in response to the reported condition. The checklist may be descriptive information about related systems impacted by the condition, or factors to keep in mind during operation. The checklist may include prescriptive actions to be considered or performed by the flight crew. However, the exact classification, if any, of the type of checklist information displayed can vary, and does not need to follow the above illustration or categories.

The checklist is shown in this embodiment in the right panel 430. This comprises a heading 402*b* "HYD PRESS SYS C" which corresponds to the status indication message 404 in the left panel 410. Underneath the heading 402*b* is the checklist 437 comprising a bulleted list. In various embodiments, the checklist may take various forms. In this embodiment, the checklist can comprise a list of prescriptive commands to be performed by the flight crew to address this condition. In other embodiments, the checklist can comprise actions that are not to be taken. Below the checklist 437 is a "checklist completed" box 438. Once this is selected, the checklist and right panel 430 is removed from the display.

The right panel 430 also includes a Deferred Item list 439. As noted earlier, a status indication may identify a condition that impacts a number of flight segments. Specifically, a status indication may impact the current flight segment as well as future flight segments. In this embodiment, the status indication message HYD PRESS SYS C of the hydraulic system has a checklist 437 associated with the current selected flight segment (cruise flight segment) but also has a checklist 439 associated with the next flight segment, which is the descent flight segment. Thus, the OCS system can provide an indication or reminder to the flight crew of future operational consequences due to the received status indication. The flight crew's response to this future checklist may be deferred until the future flight segment.

The OCS can also present synoptic diagrams, which are shown in the middle panel 420. The middle panel can either be automatically presented with the checklist panel, or the user can request it by providing touch screen input to view it. Synoptic diagrams include functional and/or system diagrams reflecting the layout, operation and/or status of components. Typically, the synoptic diagram is reflective of the design for the particular type of aircraft being flown. In this embodiment, the synoptic diagram includes the system or component associated with the status indication message. In this diagram, related hydraulic system A 421 and hydraulic system B 423 are shown with hydraulic system C 422. Thus, the synoptic diagram can include related systems in addition to the impacted system. The diagrams can show each system's configuration along with an operational readiness indicator. For example, hydraulic system C 422 has an operational status 424 of only 0.1 (or 10%) of normal, whereas hydraulic system A and system B are at 0.9 or 90% of normal. Thus, the synoptic diagrams may incorporate real time measurements, performance, or other values associated with the operation of the system displayed.

The synoptic diagram may also incorporate various function keys 427*a*-427*c* that allow the user to request more specific information, update values, or change the display to view another related system diagram. The diagram shown in middle panel 420 is of limited detail for purposes of illustration. In typical embodiments the display screen is able to present further details to the user, including labels of the various components indicated, status information, measurement indications, etc.

The flight crew can opt to view the synoptic diagrams by selecting a particular function key (not shown) than can be presented with an OCS display for retrieving associated synoptic diagrams. When the flight crew user is done with the checklist 437, an input can be provided using the Checklist Completed icon 438. Once selected, the synoptic diagram 420 and the checklist panel 430 may be cleared. The user may repeat the request for the checklist (and synoptic diagram) for the next condition indicated on the panel 410. In the current embodiment of the left panel 410, only one checklist icon 401 is shown. In other embodiments, there may be multiple checklists to review as indicated by multiple icons for multiple operational consequences information. In this way, the flight crew user can navigate and investigate each of the conditions reported, review the associated checklists, and request further system information. The user may also navigate by pressing the desired flight segment on the flight segment status indicator 200 in the left pane 410. This will automatically retrieve the set of operational consequences associated with that flight segment.

Figure 5:
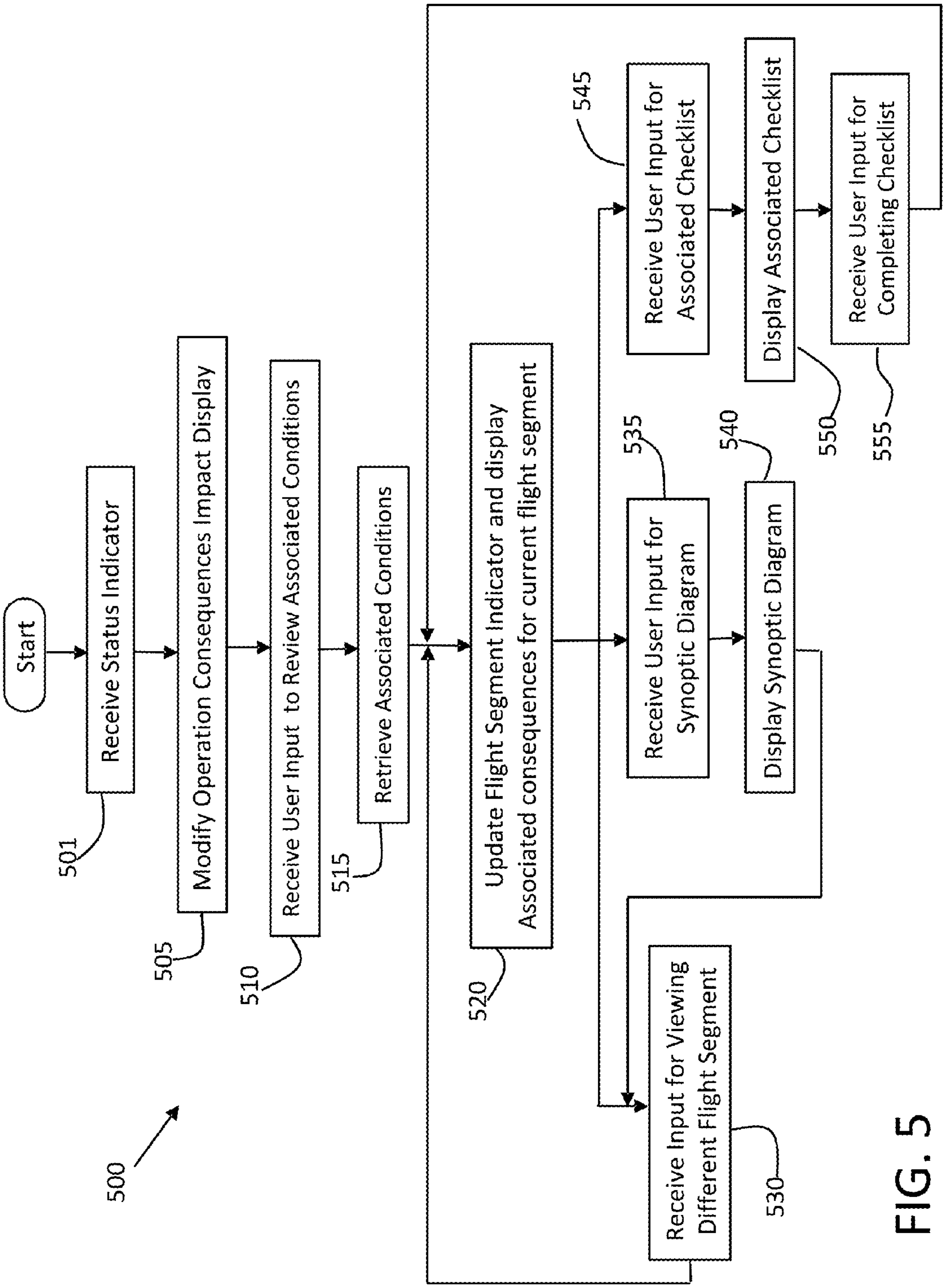
FIG. 5 illustrates one embodiment of a process flow for an operational consequences control system according to at least one embodiment disclosed herein.

The processing by the OCS of status indicators and user inputs is shown for one embodiment in FIG. 5. The process 500 starts in FIG. 5 in operation 501 with the OCS receiving one or more status indicators from one or more other aircraft systems or sensors. The OCS may receive the status indicator in various forms, using a number of communication protocols.

In operation 505, the OCS alters the presentation of the operational consequences icon 125 on the EFB, based in part on the nature of the status indicator received. In one embodiment, the status indicator could be altered to a yellow or orange color that associated with a "minor" event. A minor event may include a so-called minimum equipment list ("MEL") type of status indicator. A status indicator associated with a major event could be indicated with a red, and/or blinking presentation. Thus, the severity level of the status indication can be indicated by the manner in which the indication is provided to the flight crew.

In operation 510, the flight crew member responds to the indication provided in operation 505 by requesting information regarding the status indication and associated flight operational consequence information. The request can be provided by touching the appropriate operational consequences icon 125 on the EFB touch screen display.

In operation 515, which can occur simultaneously with operation 505, the OCS retrieves from memory the various consequences and related information of the status indication received. In one embodiment, the OCS retrieves descriptive information of the consequences of the event for the next impacted flight segment associated with the status indicator. The OCS can then retrieve other operational consequences for another flight segment when that other flight segment is requested. In other embodiments, the OCS can retrieve all of the information for the flight segments, as well as associated checklists, commands, instructions, synoptic diagrams, etc. and only present a subset of the operational consequence information for the current flight segment as appropriate.

Once this information is received, the appropriate information for the current flight segment can be displayed on the screen in operation 520. The screen format can vary, and it is not required to be presented in the format as disclosed herein. Typically, the status indication message is presented in text along with consequential information for the current flight segment. Further, the current flight segment can be displayed in a textual form, as well as by modifying the presentation of the visual flight segment indication 200.

At this point one of several types of inputs can be provided by the user. First, the user can elect to display the consequences for the status indication for another flight segment in operation 530 by selecting another flight segment. For example, the user during the "cruise" flight segment may opt to review the impacts to the "landing" flight segment." This can be accomplished by touching the appropriate flight segment on the touch screen. If so, the OCS determines which subset of the operational consequences are appropriate for this flight segment. The process flow returns to operation 520 which presents the operational consequences for that flight segment. The selected flight segment will be highlighted. In one embodiment, the highlight may be yellow for a minor event, or red for a major event.

Another type of input that the user may provide is shown in operation 545. In this operation, the user selects to review a particular consequence or condition for the purpose of retrieving a checklist. The checklist can provide descriptive or prescriptive information associated with handling of the condition. In operation 550 the checklist is presented. In some embodiments, a portion of the checklist may be displayed, and the user can scroll to view the remaining portions as needed. In operation 555, the user may acknowledge completion of reviewing the checklist by selecting the "Checklist Complete" icon 438. This input results in updating the display in operation 520.

Another type of input is reflected in operation 535. This input can be received, for example, after the user has reviewed the checklist, and requests further information associated with the condition. In one embodiment, the further information presented to the user can comprise synoptic diagrams of the relevant impacted systems. In operation 540 the synoptic diagram is displayed. In other embodiments, process flows and/or other description information can be provided to the flight crew. In some embodiments, the synoptic diagrams can provide the same level of information as provided by manuals and other system diagrams found in flight manuals. In other embodiments, the synoptic diagrams and/or checklists can provide real time measurement information of various components in the system as monitored by other system components. In other embodiments, the synoptic diagrams can be accompanied by functions keys, which allow certain functions, test, diagnostics, or calculations to be performed.

Once the user is presented with the synoptic diagram, the user can then request reviewing operational consequence information for another flight segment in operation 530. Providing a request for reviewing another segment removes the consequence information and any synoptic diagrams for the presently displayed flight segment and returns the user to viewing the consequences information for the selected flight segment.

Not shown in the process flow of FIG. 5 is the ability of the user to exit the OCS, which can occur by the user touching an appropriate function key associated with the EFB (see, e.g., FIG. 1). This can occur at any point of the process shown in FIG. 5.

The processes disclosed herein can be implemented using a variety of processing devices. As disclosed herein, the OCS can be integrated into the EFB system of a commercial aircraft. In other embodiments, the OCS can be integrated with other aircraft systems, such as the flight control information, navigation, or other forward display systems. In other embodiments, the OCS may be a stand-alone system where the display only provides operational consequences related information. In still other embodiments, the OCS can be implemented using a mobile computing device, such as a tablet processing device or smart phone. An OCS application can be loaded into the tablet or smart phone that communicates wirelessly with other systems in the aircraft in order to receive the status indications. In certain embodiments, a limited subset of the above described functionality may be available, depending on the type of processing device used.

Figure 6:
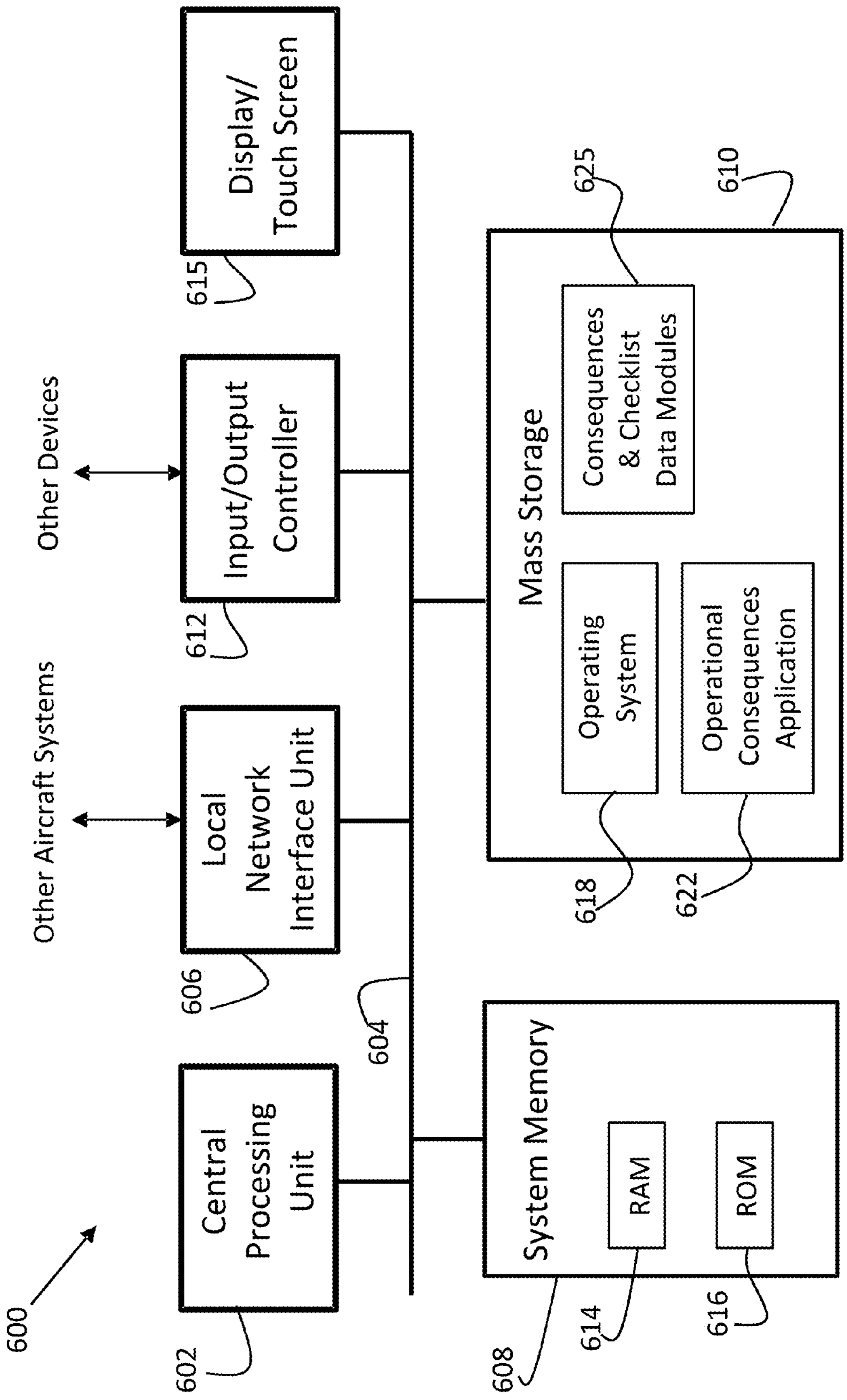
FIG. 6 illustrates one embodiment of a processing system configured for providing operational consequences information according to at least one embodiment disclosed herein.

One embodiment for a computing architecture for a device capable of executing the operations and software components described herein is shown in FIG. 6. The computer architecture shown in FIG. 6 illustrates a conventional desktop, laptop, or server computer and may be utilized to execute any aspect of the methods presented herein. The computer 600 may be a part of an existing flight information processing system or a dedicated system for providing flight operational consequence information.

The computer architecture shown in FIG. 6 may include a central processing unit 602 (CPU), a system memory 608 including a random access memory 614 (RAM) and a read-only memory (ROM) 616, and a system bus 604 that couples the memory to the CPU 602. A basic input/output system containing the basic routines for transferring information between elements within the computer 600, such as during startup, is stored in the ROM 616. The computer 600 further includes a mass storage device 610 for storing an operating system 618, and the operational consequences application programs 622, and other related data, such as consequences information and checklist data modules 625 as described herein.

The mass storage device 610 is connected to the CPU 602 through a mass storage controller (not shown) connected to the bus 604. The mass storage device 610 and its associated computer-readable media provide non-volatile storage for the central processing unit 602. Although the description of computer-readable media contained herein refers to a mass storage device, such as a hard disk or CD-ROM drive, it should be appreciated by those skilled in the art that computer-readable media can be any available computer storage media that can be utilized by the computer 600.

By way of example, and not limitation, computer-storage media may include volatile and non-volatile, removable and non-removable media implemented in any method or technology for non-transient storage of information such as computer-readable instructions, data structures, program modules or other data. For example, computer-storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be utilized by the computer 600.

According to various embodiments, the computer 600 may operate in a networked environment using logical connections to other aircraft system computers in the aircraft through a local area network controller unit 606. The central processing unit 602 may connect to via the bus 604 to the local network interface unit 606 to other systems, such as for example, to receive status indications.

It should be appreciated that the network interface unit 606 may also be utilized to connect to other types of networks and remote computer systems. In addition, the network interface unit 606 can be used in addition with, or in lieu of, the local network interface unit. For example, if the system 600 is a mobile tablet computing device, the local network interface unit may be based on using a wireless access protocol (e.g., Wi-Fi) for receiving status indication data. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

Finally, the computer 600 also comprises in one embodiment a display/touch screen 615. This is used to present information to the user, as well as to receive touch input signals associated with a function key or other input presented to the user as part of the graphical user interface.

A number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the operational consequences application 622 that is operative to perform the operations described above. The mass storage device 610 and the RAM 614 may also store other types of program modules. For example, the program modules may involve recalculation of certain parameters or values depending on the context of the reported status condition. The request for recalculation of these parameters may be linked by icons by the operational consequences application such that selection of the icon initiates recalculation of the appropriate parameters (see above, e.g., FIG. 3, "Perf" icon 330).

The mass storage device 610 may also store data module 625 comprising the consequence information for various status indicators and associated checklists. Other information may be stored, including the synoptic diagrams and status indication message text, and any other information relevant for the status condition.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A method for providing flight operational consequence information, the method comprising:

receiving a status indication associated with an aircraft component at a processing device in the aircraft during a flight;

ascertaining in the processing device one or more operational consequences comprising text strings associated with the status indication, wherein each of the one or more operational consequences are associated with one or more flight segments of the flight;

receiving user input selecting a flight segment, wherein the selected flight segment is not a current flight segment;

displaying at least a subset of the one or more operational consequences on a display associated with the processing device; and indicating the selected flight segment on the display in association with at least the subset of the one or more operational consequences.

2. The method of claim 1, wherein the one or more operational consequences comprises a particular operational consequence and the method further comprises:

receiving input from a user selecting the particular operational consequence;

retrieving a checklist stored in a memory of the processing device wherein the checklist is associated with the particular operational consequence; and displaying the checklist associated on the display.

3. The method of claim 2, further comprising:

retrieving a synoptic diagram of an aircraft system associated with the aircraft component, wherein the synoptic diagram is stored in the memory; and displaying the synoptic diagram on the display.

4. The method of claim 3, wherein the synoptic diagram comprises a first and second color, with the first color associated with a first set of components of the system functioning correctly and the second color associated with the aircraft component.

5. The method of claim 3 wherein displaying the synoptic diagram on the display comprises displaying one or more real time performance values associated with the synoptic diagram.

6. The method of claim 2 further comprising:

displaying an icon prompting the user to recalculate a flight parameter;

receiving input from the user requesting recalculation of the flight parameter; and providing the recalculated flight parameter on the display.

7. The method of claim 1 further comprising: determining a severity level of the status indication received; and providing an indication of the severity level to the user.

8. A system for providing operational consequence information to a user, the system comprising:

a local area network interface configured to receive a status indication from a plurality of systems on an aircraft;

a memory configured to store a plurality of operational consequences associated with the status indication, wherein the plurality of operational consequences are associated with one or more flight segments;

a display configured to display the plurality of operational consequences to the user; and a processor configured to receive the status indication from the local area network interface, determine a current flight segment of a flight of the aircraft, retrieve the plurality of operational consequences associated with the status indication, present on the display a status indication message and a first subset of the plurality of operational consequences associated with the current flight segment, receive an input from the user indicating a subsequent flight segment, identify a second subset of the plurality of operational consequences wherein the second subset of the plurality of operational consequences are associated with the subsequent flight segment, and display at least a subset of the second subset of the plurality of operational consequences along with an indication of the subsequent flight segment.

9. The system of claim 8, wherein the processor is configured to receive input from the user selecting a particular operational consequence from the first subset of the plurality of operational consequences, retrieve a checklist stored in the memory associated with the particular operational consequence, and display the checklist to the user in response to selecting the particular operational consequence.

10. The system of claim 9 wherein the processor is further configured to:

calculate a flight performance parameter in response to a user input provided in response to displaying the first subset of the plurality of consequences.

11. The system of claim 9 wherein the memory stores a checklist associated with one of the plurality of operational consequences and the processor is configured to present on the display the checklist to the user.

12. The system of claim 8, wherein the memory is further configured to store a synoptic document associated with the status indication and the processor is configured to retrieve the synoptic document in response to a user input requesting synoptic information associated with the status indication.

13. The system of claim 8, further comprising:

wherein the memory is further configured to store a severity level associated with the status indication and the processor is further configured to display an operational consequences indication based on a color associated with the severity level of the status indication.

14. A computer storage medium having computer executable instructions stored thereon which, when executed by a computer, cause the computer to:

receive a status indication indicating an abnormal condition associated with a component in an aircraft;

determine a severity level associated with the status indication;

display a notification to a user of an operational consequence associated with the status indication;

receive input from the user to display a status indication message and the operational consequence;

retrieve the operational consequence associated with the status indication for a current flight segment;

display the status indication message, the operational consequence, and a flight segment indication corresponding to the current flight segment to the user;

receive input from the user indicating a future flight segment;

determine another operational consequence associated with the future flight segment; and display the another operational consequence associated with the future flight segment.

15. The computer storage medium of claim 14, further comprising instructions that further cause the computer to:

receive input from the user requesting a checklist associated with the operational consequence;

retrieving the checklist from memory associated with the status indication; and displaying the checklist to the user.

16. The computer storage medium of claim 14, further comprising instructions that further cause the computer to:

retrieve a synoptic diagram associated with the component; and display the synoptic diagram to the user.

17. The computer storage medium of claim 14, further comprising instructions that further cause the computer to:

prompt the user to recalculate a flight parameter; and recalculating the flight parameter in response to a user input.

* * * * *